United States Patent Office 3,501,275
Patented Mar. 17, 1970

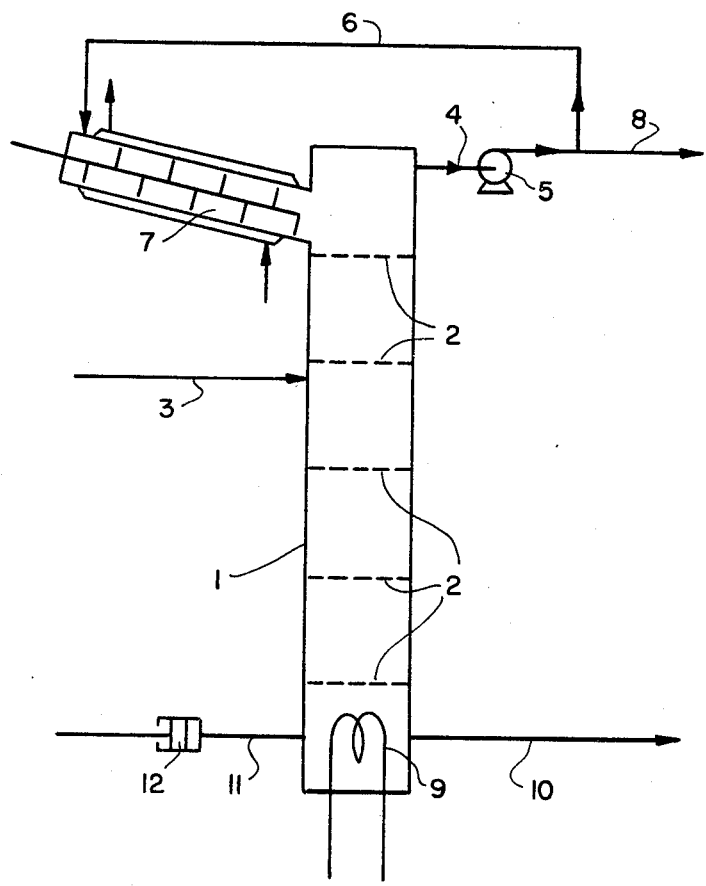

3,501,275
APPARATUS FOR CONTINUOUSLY SEPARATING MIXTURES OF SUBSTANCES BY MULTISTAGE RECTIFYING COLUMN CRYSTALLIZATION
Richard Sailer, Hanswerner Philipp and Clau Berther, Domat, Ems, Switzerland, assignors to Inventa A.G. für Forschung und Patentverwertung, a corporation of Switzerland
Filed May 27, 1968, Ser. No. 732,396
Claims priority, application Switzerland, May 26, 1967, 7,508/67
Int. Cl. B01d 9/00; C07c 37/22; C07b 29/00
U.S. Cl. 23—273                                1 Claim

ABSTRACT OF THE DISCLOSURE

An apparatus for fractional crystallization including a column of axially spaced screen plate disposed therein, a pulse means connected to the base of said column, crystallizer means connected at one end to the head of the column, and means for recirculating part of the removed lower melting point product to the other end of the crystallizer.

---

The use of crystallization for purifying substances or for separating mixtures of substances has been known for a long time. Crystallization is used particularly when other separating methods, e.g. extraction or distillation, do not have the desired effect. The commercial use of crystallization from a melt has considerable economic advantages over other purifying and separating operations because solvent regeneration is unnecessary and the heat for melting is only a fraction of the evaporation heat required in distilling.

Substances forming mixed crystals must be separated by multistage crystallization. In most cases, however, in purifying or separating organic substances, the materials will be those forming eutectics. These substance-mixtures can in theory be separated into a pure substance and a eutectic in a single crystallizing stage. In practice, however, it has been found that even for these substance-mixtures more than one stage is necessary, if complete separation is to be obtained. This separation may be carried out by partly crystallizing a substance, separating the crystals from the melt, remelting the crystals and partly crystallizing again, and by repeating this procedure as often as is necessary. This method is, however, laborious, time-consuming and, when used commercially, requires a considerable amount of apparatus and space.

The relevant literature describes numerous methods and devices for continuous single or multistage crystallization.

Thus according to U.S. Patent No. 2,854,494, the melt is largely removed from a crystal slurry in a purifying column by means of a wall filter, the resulting crystal bed being pressed against a melting device. The resulting melt is partly removed as a product and partly flows in counterflow to the crystal bed. This counterflow is assisted by a pulsation produced by a device located at the heating end of the column. This method, however, provides only somewhat more than one stage.

In the "Zeitschrift für angewandte Chemie" 1961, 612–615, a method is described which has all of the characteristics of multi-stage column crystallization, namely: crystals and melt in counterflow, an adiabatic portion of the column, a temperature gradient in the column, crystal production and removal of the low-melting-point, substance at one end of the column, a melting device and removal of the high-melting-point substance at the other end of the column, raw-material feed at a location between the ends of the column, and an adjustable return ratio. In this method the crystals are transported by means of a spiral rotating in an annular gap. Mixed-crystal systems can be separated by this method. Since there are limits to the dimensions of a spiral, the use of this method on a large scale requires very considerable technical expenditure.

Finally, Swiss patent application 6340/66 describes a commercial process for column crystallization in which the crystals are transported in a column by means of a rotating screen-worm in conjunction with an up-and-down movement imparted to the crystal slurry.

If column crystallization is to be used on a large scale, it is of advantage that the equipment be as technically uncomplicated as possible. The simplest form of column crystallization, as described in U.S. Patent No. 2,540,977, is a tube in which the transportation of the crystals is effected by gravity. However, an arrangement of this kind is not very efficient, since remixing occurs due to heat convection and there is no satisfactory counterflow between the crystals and the melt. Moreover, because of the small difference in density between the crystals and the melt, the transportation of the crystals is in most cases inadequate.

Now the object of the present invention is a method for continuously separating mixtures of substances by multistage rectifying column crystallization, with the crystals and liquids in counterflow in a column, by substance-exchange between the solid and the liquid phase, the product with the high melting point occurring at the base of the column, where it is discharged, and the product with the low melting point occurring at the head of the column, whence it is removed. The invention is characterized in that the transportation of the substance is carried out in a column containing a plurality of screen plates provided with apertures through which the crystals can pass, and in that the mixture of crystals and liquid is moved up and down in the direction of the axis of the column.

Use is accordingly made of a device suitable for continuously separating mixtures of substances by multistage rectifying column crystallization by substance-exchange between the solid and the liquid phase, the said device consisting of a column into which is charged a crystal slurry obtained by cooling (preferably in a cooler) the liquid mixture of substances consisting of crystals and molten material the substance having the high melting point being withdrawn from the base and the substance having the low melting point being withdrawn from the head of the column, a portion of the latter substance being returned, after cooling (preferably carried out in a cooler), in the form of a crystal slurry and as a reflux, to the said column, and (the device consisting of) a melting device by means of which the crystals occurring at the base of the column are melted. The new device is characterized in that the column contains a plurality of screen plates provided with apertures through which the crystals can pass, and in that a line filled with molten material opens into the melting chamber at the base of the column, by means of which the contents of the column are moved axially up and down by means of a device.

The new method has the advantage of exhibiting all of the characteristics of column crystallization, without being restricted in its field of application by technical problems, since the device used for the purpose has no mechanical transportation mechanisms. The incorporation of screen plates into the column prevents convection currents in the crystal slurry.

The screen plates may be perforated plates of wire fabric. The size of the holes may vary between 2 and 50 mm. depending on the size of the crystals and the column. The holes may be of any desired shape, e.g. rectangular, square, cylindrical, or conical. The distance between the screen plates and the ends of the column is governed by the separating problem and the height of the column, and may be from 0.1 to 5 times the diameter of plates. The up-and-down movement of the crystal slurry in the column occurs at a frequency between 5 and 500/min., preferably between 50 and 200/min. The length of the stroke is preferably up to 200 mm.

A technically satisfactory form of execution of the new device is illustrated in the figure. The fresh product is introduced into column 1, containing screen plates 2, through line 3. At the head of the column the melt is passed into cooling device 7 via line 4, pump 5, and line 6 and, after partial crystallization, returns thence into column 1. A portion of the melt is removed through line 8 as the substance with the low melting point. In the lower portion of the column the crystals are melted by heating device 9. A portion is removed through line 10 as the high-melting-point substance, and a portion constitutes the reflux which moves upwards in counterflow to the crystals. The column is connected through line 11 to device 12 which moves the contents of the column up and down. As shown in the figure, this device is, for example, a piston driven by a motor. As shown in the figure, heater 9 may be inside the column, but may also be located outside. Cooling device 7 may be a scraper-cooler, fitted laterally, as shown in FIG. 1, but may also be an axial extension of the column.

Cooling device 7 may also be a cooling roll which converts a portion of the melt into flakes. These flakes, mixed with the rest of the melt, are then passed to the column. Finally, any suitable cooling device may be used. In order to ensure adiabatic operation, it is advisable to provide the column with good insulation and/or gravity or counterheating.

The crystal content of the slurry in the column is governed by its viscosity, but will in most cases amount to between 20 and 60%. Measurement and control of temperatures and production-flow may be accomplished in any technically known way.

With the new method, all substances and mixtures of substances which crystallize and melt without decomposing may be purified or separated.

EXAMPLE 1

Crude caprolactam having the following purity characteristics is purified: permanganate number=<50; volatile bases: 0.80; APHA number≧100, and solidification point=68.65°.

Use is made of a column 15 cm. in diameter and 1 m. high, containing 8 screen plates made of wire fabric of 4 mm. mesh. The frequency of the axial up-and-down movement of the column content is 150/min. The cooling device has an output of 10 kg. of crystal/hr. The hourly throughput is 4.1 kg. of fresh product, of which 0.6 kg. is removed at the upper end of the column as the low-melting-point substance enriched with impurities, and 3.5 kg. of pure lactam are removed from the lower portion of the column as the high-melting-point substance. The purified caprolactam now has the following purity characteristics: permanganate number=8000; volatile bases =0.07; APHA number=5; solidification point=69.01° C.

The permanganate number was obtained in known fashion by measuring the time in seconds required to decolourize 1 ml. of $1/100_n KMnO_4$ solution, mixed with 100 ml. of 1% aqueous lactam solution, to the shade of an equal amount of comparison solution. The comparison solution is produced by dissolving 3 g. of $CoCl_2 \cdot 6H_2O$ and 2 g. of $CuSO_4 \cdot 5H_2O$ in 1 litre of water.

The volatile-base number is determined by distilling, from a solution of 20 g. of lactam in 200 ml. of 1 n NaOH, 100 ml. of $H_2O$ in a receiver charged with 0.1 n of acid. The consumption of 0.1 n of acid in millilitres determined by back titration, and equivalent to the bases distilled over, is the liquid bases number.

The APHA number is determined by comparing a 40% aqueous solution (lactam) with the dilution series of a standard solution. The standard solution contains 1.245 g. of potassium-chlor-platinate ($K_2PtCl_6$) and 1 g. of cobalt chloride in 1 litre of water, and corresponds to 500 APHA units.

EXAMPLE 2

Yellowish phenol, having a melting point of 39.3° C., is purified in a column as described in Example 1. The screen plates consist in wire network having a mesh size of 5 mm., the frequency of the axial up-and-down movement being 50/min.

4.9 kg./h. of crude phenol are introduced into this column. 0.6 kg./h. of impure phenol are taken off at the top of the column, while at the bottom of the column 4.3 kg./h. of pure phenol are taken off. The pure phenol, having a melting point of 41.5° C., is colorless.

We claim:
1. Apparatus for continuously separating mixtures of substances by fractional crystallization comprising a column, means for feeding said mixture of said substances to the middle of said column, means for removing higher melting material from the base of said column, heater means disposed in the base of said column for melting crystals occurring in the lower end of said column, a pulse means connected through a line filled with molten material to the base of said column, whereby the contents of the column are moved axially up and down, a plurality of axially spaced screen plates disposed in said column having apertures of about 2 to 50 millimeters through which said crystals can pass, means for removing the lower melting point product from the head of said column, crystallizer means connected at one end to the head of said column including cooling and crystal removal means, and means for recirculating part of the removed lower melting point product to the other end of said crystallizer means.

References Cited

UNITED STATES PATENTS

| | | | |
|---|---|---|---|
| 2,613,136 | 10/1952 | McKay | 23—273 |
| 2,615,793 | 10/1952 | Weedman | 23—273 |
| 2,615,794 | 10/1952 | Shelby | 23—273 |
| 2,747,001 | 5/1956 | Weedman | 23—273 X |
| 2,752,230 | 6/1956 | Findlay | 23—273 |
| 2,919,991 | 1/1960 | Ratje | 23—273 X |
| 3,255,598 | 6/1966 | Cottle | 62—58 |
| 3,261,170 | 7/1966 | McCarthy | 23—273 X |
| 3,305,320 | 2/1967 | Weech | 62—58 |
| 3,392,539 | 6/1968 | Grimmett | 62—58 |
| 3,402,047 | 9/1968 | Shaul | 62—58 |

NORMAN YUDKOFF, Primary Examiner

S. J. EMERY, Assistant Examiner

U.S. Cl. X.R.

23—295; 62—58, 123